June 22, 1948.  L. R. GRUSS  2,443,616
SHOCK ABSORBER
Filed Nov. 22, 1944  2 Sheets-Sheet 1
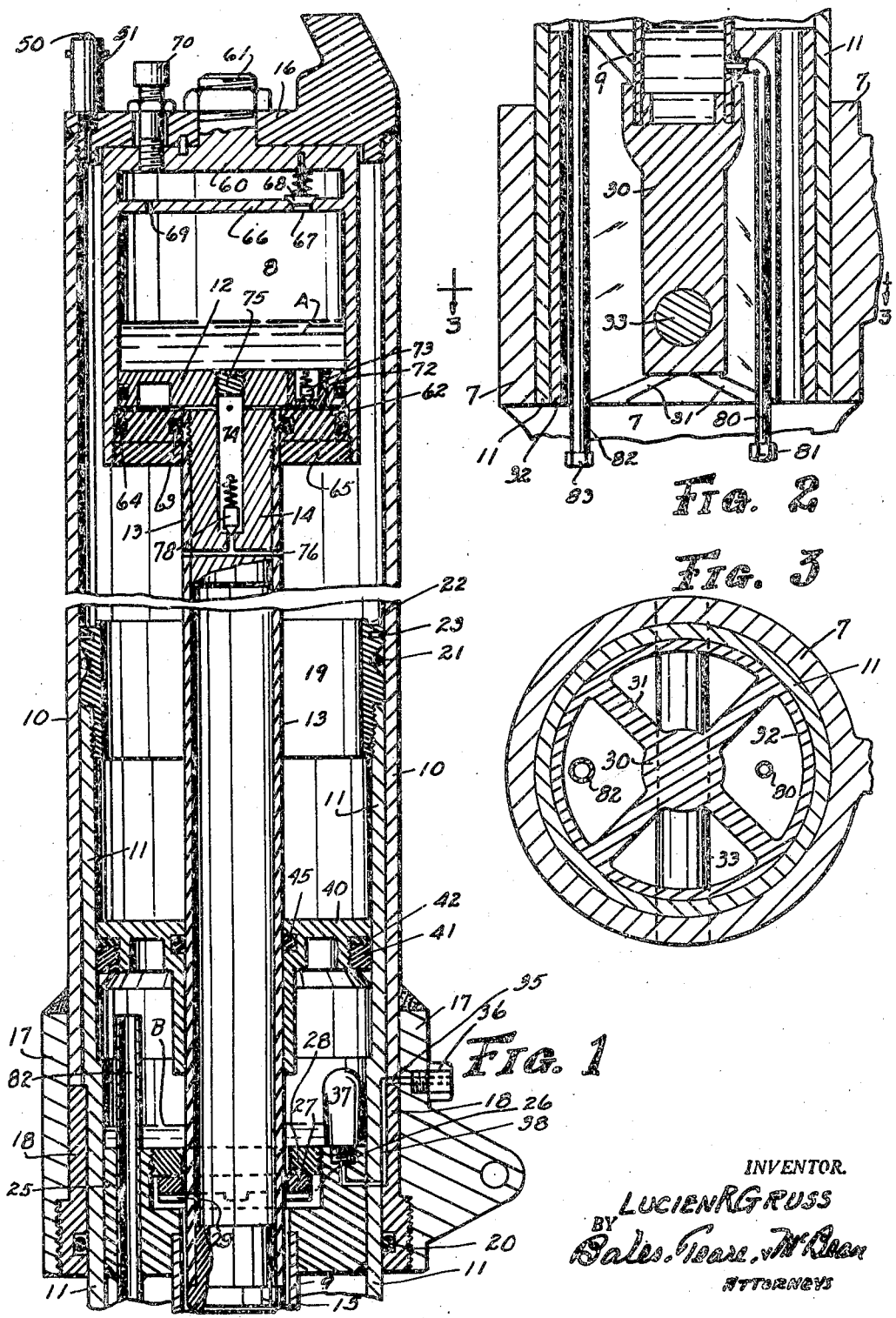
INVENTOR.
LUCIEN R. GRUSS
BY
ATTORNEYS

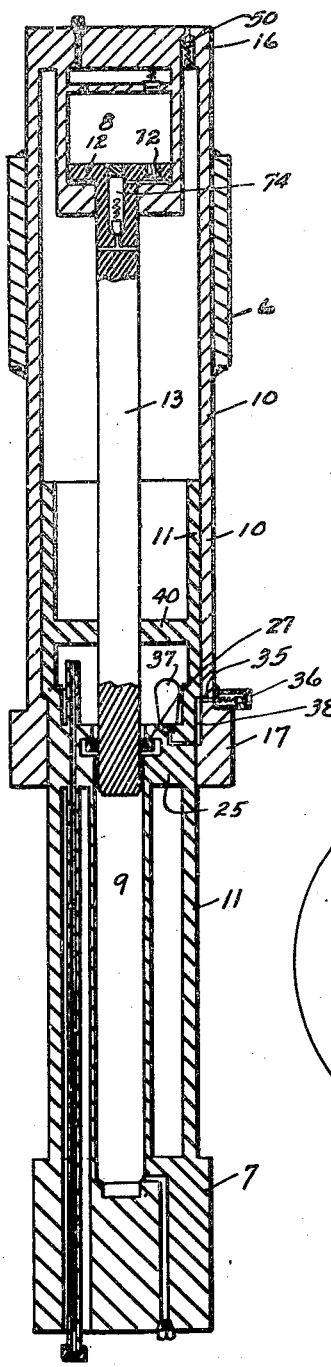
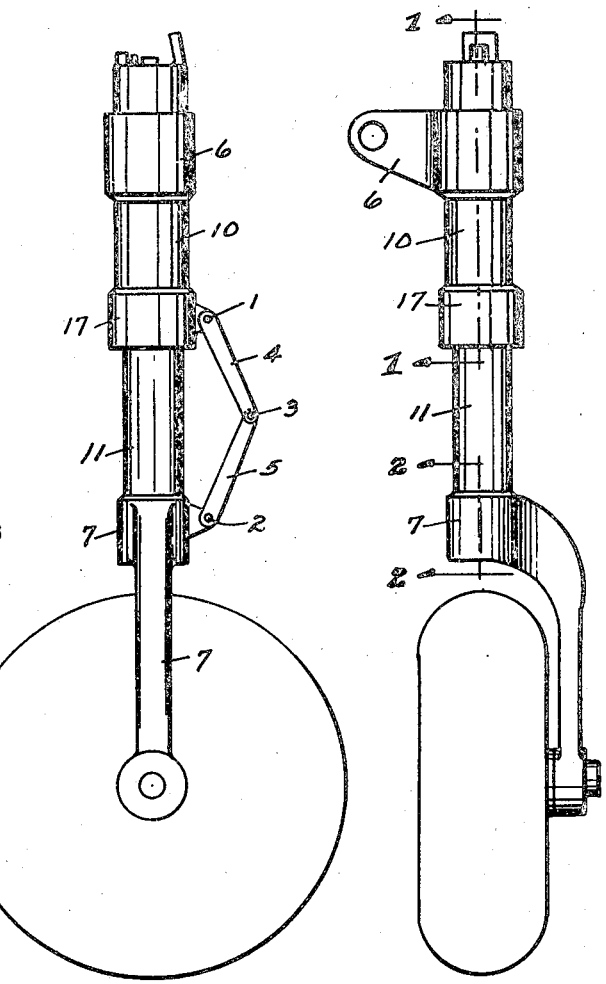
Fig. 4
Fig. 5
Fig. 6

Patented June 22, 1948

2,443,616

UNITED STATES PATENT OFFICE 2,443,616

SHOCK ABSORBER

Lucien R. Gruss, Middletown, Ohio

Application November 22, 1944, Serial No. 564,665

12 Claims. (Cl. 267—64)

1

This invention relates to shock absorbers for use between two relatively movable members. For instance, it is adapted for use in connection with the landing gear of aircraft.

As applied to aircraft work this invention embodies two telescopically movable members each of which is mounted on one of the relatively movable parts of the aircraft, these members housing a floating ram, one end of which operates against fluid under pressure in a cylinder within one of the telescopic members, the other of which operates against fluid under pressure in a cylinder in the other telescopic member.

One of the objects of this invention is to enable a comparatively high pressure to be automatically built up within one of the cylinders with only a few strokes of the telescopic members, such as occurs during a taxiing operation over comparatively rough ground or as results from a few bumps either in the take-off or landing movement.

The provision for obtaining a high compression of resisting fluid within the shock absorber as a result of a few strokes thereof obviates the necessity for servicing a plane before take-off by pumping up the shock absorbing chambers to the desired degree, as is customary in the conventional operation. In this invention regardless of how long the equipment may have remained idle it is only necessary to taxi the plane over the ground or cause it to hop on the course a few times until the relative axial motion of the parts of the shock absorber have built up the desired pressure.

It is a further object of this invention to provide the means for enabling the building up of the high pressure desired without materially increasing the size of the shock absorber or the number of operating parts and to accomplish the result in a simple and efficient manner. A further object is to provide ready means for insuring the insertion and maintenance of the proper amount of liquid for a liquid-and-air cushion in the shock absorber.

My invention is illustrated in the drawings hereof and hereinafter more fully explained.

In the drawings, Fig. 1 is an axial section, of the upper member, partly broken away, and the upper portion of the lower member of my improved shock absorber; Fig. 2 is an axial section of the lower portion of the lower member, being a downward continuation (with an intermediate break-out) of parts shown in Fig. 1; Fig. 3 is a cross section through the lower portion of the shock absorber, as indicated by the line 3—3 on Fig. 2; Fig. 4 is a diagrammatic axial section

2 through the two relatively movable members of the shock absorber, this view omitting many details and illustrating each member without regard to the separation of its various parts in manufacture or assemblage; Figs. 5 and 6 are side and end views respectively of the exterior of the complete device.

In the case of an airplane installation of my shock absorber, I provide a member 10 which may be pivotally attached in the usual way through a band 6 (Figs. 4, 5 and 6) to one of the wings and a member 11 which may be attached in the usual way to a wheel-supporting bracket 7. Such members are telescopically mounted with respect to each other and each has a cylinder therein, designated 8 and 9 respectively, shown as being in axial alignment, and there is a floating piston or ram operating against fluid in each cylinder. The ram has a piston 12 operating in the cylinder 8 and has a fluid tight seal between its peripheral portion and the wall of the cylinder and has a rod 13 which extends into the cylinder 9 and operates as a plunger therein. The rod is preferably hollow but closed at its opposite ends, as by an extension 14 of the piston 12 threaded into its upper end and a plug 15 at the lower end.

The rod 13 is smaller in diameter than the bore of the cylinder 9 so as to drive liquid in the cylinder out of it as the plunger moves downwardly therein, upon impact of the wheel with the ground. The members of the shock absorber are kept in alignment by means of links 4 and 5 (Fig. 5) which are respectively connected to the members at 1 and 2, and are pivotally connected together at 3.

The member 10 is closed at its upper end by a head 16. The lower end of this member is provided with a band 17 tightly secured to it, as by welding. Threaded into this band and abutting the member 10 is a sleeve 18 which is somewhat thicker than the member 10 and thus provides an inward shoulder at their junction. The member 11 is offset outwardly to provide a downward shoulder which coacts with the top of the sleeve 18, these shoulders forming a stop preventing separation of the parts.

The member 11 carries at its upper end an extension shown as sleeve 19 threaded into member 11 and of greater thickness than the member, the outer periphery of this sleeve registering with that of member 11. The sleeve 18 has an inwardly facing groove in which is a packing 20, which engages member 11; the extension 19 has an outwardly facing groove occupied by a packing 21, which engages the inner periphery of the member 10. The two members 10 and 11 are thus mutually packed in two regions to insure against leakage between them.

The packings 20 and 21 are preferably single annular members of rubber or similar material circular in cross section, being thus of the type commonly known as O-rings. The grooves in which the O-rings are seated are large enough to allow some movement of the rings, which maintains the rings in their pliable state. Oil on the inner wall of the cylinder 10 is sufficient to maintain these rings in proper lubricated condition. To insure such oil passing to the wall, I provide an annular oil receptacle 22 in the upper end of the sleeve 19 which may trap a small quantity of oil admitted into the upper portion of the cylinder 10. Below this receptacle 22, I may also form an annular oil-trapping groove 23.

Mounted within the member 11 and rigidly secured to it, as by welding, is a head 25 which freely surrounds the rod 13 and carries the upper end of the cylinder 9. The lower end of this cylinder is mounted in the hub 30 of a spider having arms 31 connecting the hub to a cylindrical sleeve 32. This sleeve is snugly mounted in the lower portion of the member 11. The spider and member 11 are connected to the band 7 of the attaching member by a crosspin 33 passing through the spider, the member 11 and the band 7, as shown in Figs. 2 and 3. This firmly attaches all of these parts to the attaching bracket 7 which, as indicated in Figs. 5 and 6, carries the landing wheel.

In the head 25 within the member 11 is an upwardly facing recess 26 in which is mounted an annular valve member 27 retained in place by an annular nut 28 screwing into the head.

The valve member 27 is formed with ribs 29 on its under face, with the result that when the member is resting at the bottom of the recess there is an ample passageway provided from the annular space within the cylinder 9 about the rod 13 outwardly beneath the valve member 27 and thence upwardly over the valve member and through the space between the rod 13 and nut 28. On the other hand, there is only a very restricted downward space available when the valve member seats against the nut, as shown in Fig. 1, this space being hardly greater than the clearance space between the annular valve member and rod 13. The purpose of this will be hereinafter explained.

As the cylinder 11 overhangs the fixed sleeve 18 as heretofore mentioned, there results an annular space between the lower portion of the cylinder 11 and the wall 10 as the cylinder 11 rises above the position shown in Fig. 1. I provide a passageway 35 from the exterior to this space controlled by an outwardly-seating check valve 36, Fig. 4, so that air may flow into the annular space as the member 11 rises. I mount on the head 25 a closed air cell 37 which connects by a passageway 38 with the annular space mentioned. Accordingly, when the member 11 descends, the air in the annular space about it cannot pass out through the opening 35 but is compressed in the air cell and the passageway thereto; then on the next upstroke of the member 11 such compressed air expands to fill the annular space about the member. This provision prevents any troublesome vacuum being formed in the annular space about the member 11.

Within the member 11, a suitable distance above the head 25, is a stationary head 40 secured to the member 11 and snugly embracing the rod 13. As shown in Fig. 1, I have provided an internally threaded ring 41 which is welded to the member 11. The head 40 is threaded into this ring and clamps an interposed gasket 42. At the inner periphery of the head it is provided with a groove in which is an O-ring packing 45 snugly engaging the rod 13.

The cylinder 8 in which the piston 12 of the ram 13 operates is of smaller external diameter than the internal diameter of the member 10 so as to leave an annular space between them into which a skirt, provided by the member 11 and its extension 19, may extend. An inwardly opening check valve 50 controls admission to this annular space from the outside.

The valve 50 may be carried in a casing 51 having the usual provision for attachment of the head of an air supply pipe, after the manner of an ordinary filling nipple on a tire. Thus such air supply may be attached and the annular space within the wall 10 and above the partition 40 filled with air under desired pressure at the installation of the shock absorber.

The cylinder 8 is shown in Fig. 1 as having an upper head 60 provided with a shank 61 adapted to extend through the head 16 and receive a nut to hold the cylinder in place against the head. Mounted within the lower portion of the cylinder 8 is a lower head 62 having internal and external grooves, the former carrying packing 63 coacting with the rod 13 and the latter carrying packing 64 engaging the cylinder wall. This lower head is held in place by an annular nut 65 screwing into the cylinder and forcing the member 62 against a shoulder of the cylinder.

The cylinder 8 is provided near its upper portion with a transverse partition 66 having a passage 67 through it controlled by a downwardly seating check valve 68 and having also a much smaller passage 69 open at all times. The passages 67 and 69 lead to a chamber within the cylinder above the partition 66.

The space above the oil A in the chamber 8 is filled with air under pressure sufficient to keep the piston 12 away from the partition 66 when the plane is standing on the ground. Such arrangement enables the piston 12 as it moves upwardly in the cylinder 8 to work against the liquid and air under pressure therein, the valve 68 operating to permit the fluid to move rapidly therethrough in an upward direction, but to cause it to move at a more restricted rate in the opposite direction solely through the opening 69. This cushions the rebound and avoids an objectionable jerk on the wings of the airplane.

I have shown a normally closed filling nipple 70 communicating with the upper chamber within the cylinder 8. This filling nipple may be availed of to supply a proper quantity of oil at the installation of the shock absorber. This oil passes through the vent 69 and thus accumulates as the layer indicated at A in Fig. 1 in the lower portion of the cylinder 8 above the piston head 12 and acts to prevent leakage of air past the piston.

There is a controlled passageway for air under pressure from the annular space within the cylinder 10 upwardly through the piston 12, thence through the oil layer into the cylinder 8 above the oil layer. This passageway, as shown in Figs. 1 and 4, is effected first by a sleeve 72 set into the piston 12 and having an opening in its bottom controlled by a check valve 73, and, second, by the space on the underside of the piston communicating with an axial space 74 in the piston 12 and its extension 14 leading outwardly at 76 through the ram sleeve 13. The axial space 74 is closed at its upper end by a plug 75. A check valve 78 within the axial space 74 normally closes the passage 76.

It results from the construction described that as the ram moves upwardly in the shock absorber the piston 12 rising compresses the air in the cylinder 8 and allows it to pass through the opening 67 into the chamber above the partition 66 as well as to gradually seep through the restricted opening 69 into the such upper chamber. The compressed air in the annular space beneath the cylinder head 65 readily follows the piston 12 through the passageway 76, past the check valve 78 into the axial space 74 and thence into the space between the heads 12 and 62. Then on the downward stroke of the piston 12 such air is blocked by the check valve 78 and passes upwardly past the check valve 73 into the space above the piston 12.

The purpose and operation of the various valves above described will be apparent from the description of the operation of my shock absorber about to follow. It should be noted first that a layer of liquid indicated at A in Fig. 1 is constantly maintained above the piston 12. Another oil supply is constantly maintained in the cylinder 9 or the chamber above the head 25 (according to the position of the ram in the cylinder 9) the lowermost position of the oil layer being indicated by the broken line B in Fig. 1, and the uppermost position being at the top of an overflow pipe 82. This oil in the ram cylinder and extended above it constitutes a non-compressible resisting device against the downward movement of the ram, the viscosity of the oil and the restriction of its escape passage from its cylinder causing it to travel slowly in this action.

The liquid forming the layer B may be installed through a pipe 80, Fig. 2, which leads from the exterior upwardly through the spider 30 to the interior of the cylinder 9, this pipe being normally closed by a cap 81. A normally capped overflow pipe 82, above referred to, extends from the normal top plane of the liquid B downwardly through the head 25 and within the spider 30 to the exterior.

In installing the oil B at the installation of the shock absorber I remove the caps 81 and 83 on the pipes 80 and 82, and while the ram is in its lowermost position, I force oil up the pipe 80 until it begins to overflow through the pipe 82. Then the caps 81 and 83 are replaced and just the desired amount of oil is trapped in the cylinder 9 and the chamber above the head 25.

In describing the operation of my shock absorber, let us assume that the upper portion is connected at 6 to the wing of an airplane and the lower portion at 7 to a landing wheel. Then, when the airplane is in the air, the parts of the shock absorber will assume by gravity the position shown in Figs. 1 and 4. There will be a layer of oil in the chamber 8 above the piston 12 and compressed air in that chamber above the oil. The space in the cylinder 10 above the partition 40 and outside of the cylinder 8 will be filled with compressed air. The ram cylinder 9 will be filled with oil and the space between the head 25 and the partition 42 will be filled with air.

Now when the wheel strikes the ground the cylinder 11 will be suddenly forced upwardly into the cylinder 12. The oil in the cylinder 9 will make a retarding influence for the ram as the bottom of that cylinder approaches the bottom of the ram, but such oil will be forced out slowly upwardly through the restricted space within the valve 27 into the confined chamber above the head 25 thereby compressing the air within that chamber, which cushions the final portion of the stroke.

The resistance of the oil within the cylinder 9 will cause the ram to move upwardly somewhat, whereby the piston 12 on the head of the ram compresses still further the air in the cylinder 8. The skirt 11 rising into the annular space about the cylinder 8 will increase the air pressure in such space, and the partition 40 approaching the top of the shock absorber will further compress the air in the annular space surrounding the ram 13. Accordingly air under high pressure will pass via the passageway 76 and 74, into the space beneath the piston 12, and will pass through the piston and the oil layer A into the space above the oil layer, unless that space already contains as great an air pressure. The cushion made by the compressed air in the cylinder 8, added to that beneath the partition 40, causes the action of the shock absorber to be gradual and comparatively gentle in reaching the final collapsed position.

Now when there is a cessation of downward pressure on the ground, due to the slight rising of the airplane after the original impact, compressed air in the space above the partition 66 gradually passes back through the passageway 69, and the oil above the head 25 gradually passes back to the cylinder 9, and thus the parts are restored slowly to their extended position.

When it is desired to replenish the air pressure within the cylinder 8 it is not necessary to pump it up from an external source but replenishment may be readily effected by taxiing the airplane over a somewhat rough terrain or bouncing it somewhat, by the action of its controls, if traveling on a smooth surface. These hops result in quickly reciprocating the movable parts. The action of the skirt on the movable member 11 in the restricted annular space about the cylinder 8 serves to give a high compression to the enclosed air, resulting in the same passing very quickly through the passageway 76, 74 and 72 and thus into the space above the oil in the cylinder 8. The result is that it is only necessary for the aviator to make a few hops with his airplane over the ground to replenish the air in the shock absorber.

If at any time leakage causes the air pressure above the partition 40 to be reduced to a point where in the lowermost position of the cylinder 11 such pressure is less than the atmosphere, then the check valve 50 automatically opens, supplying air from the outside. Accordingly, the internal air can never be lower than atmospheric pressure when the shock absorber is fully extended, and hence the internal pressure is necessarily many atmospheres when the shock absorber is fully collapsed since the stroke is sufficient to expel almost all of the contents between the partition 40 and the upper cylinder.

I claim:

1. In a shock absorber, the combination of two telescopic sleeves, a cylinder within one of the sleeves, a partition across the other sleeve spaced from said cylinder, a ram slidable through the partition and connected to a piston in said cylinder, and a cylinder in which the ram operates, said last-mentioned cylinder being spaced beyond the partition to leave a chamber between them in restricted communication with the last-mentioned cylinder.

2. A shock absorbing device for use between two relatively moving parts, comprising two telescopically mounted tubular members, a cylinder held by the outer member and having its wall spaced from the wall of the outer member, the inner member having an internal head and a cylindrical skirt adapted to project into the space between the outer member and its internal cylinder, and a floating member comprising a piston in the last mentioned cylinder and a rod projecting through said internal head into a cylinder carried by the inner member.

3. In a shock absorber, the combination of two telescopically mounted cylindrical members, one of the members having a cylinder, a piston within it, a piston rod connected to said piston, a second cylinder in the other member in which the piston rod operates, said members having successive portions of different diameters adapted to leave an annular space between them, means for admitting air from the outside to such annular space, an inwardly opening check valve controlling such admission, a closed air cell within the shock absorber, and a passageway therefrom to said annular space.

4. In a shock absorber, the combination of two members telescopically movable one within the other and each having a cylinder, a member extending from one of said cylinders to the second cylinder and operating to displace fluid in each of them, means providing a chamber associated with the second cylinder and in communication therewith adapted to receive displaced fluid therefrom, there being a space within the telescopic members closed from said chamber and from said second cylinder and adapted to contain fluid to be compressed by the relative movement of said telescopic members toward each other, and means providing a passageway from said space into said first cylinder.

5. In a shock absorber, the combination of two members telescopically movable one within the other and each having a cylinder, a member extending from one cylinder to the other and operating to displace fluid in each of them, an internal partition in one of the telescopic members providing a chamber associated with one of the cylinders and in communication therewith adapted to receive displaced fluid therefrom, there being a space between said partition and the other cylinder adapted to contain fluid to be compressed by relative movement of said telescopic members toward each other, and means providing a passageway from said space into the last-mentioned cylinder.

6. In a shock absorber, the combination of two telescopically movable members each having a cylinder, a piston in one of said cylinders, a piston rod leading therefrom into the second cylinder, means providing a chamber between the cylinders, there being a constantly open passageway from the second cylinder about the piston rod to said chamber, there being an annular space about said piston rod between the wall of said chamber and the head of the first cylinder, means providing a passageway from said annular space to the space beyond said piston, and valve means controlling said passageway.

7. In a shock absorber, the combination of two telescopically movable members each having a cylinder, a piston in one of the cylinders, a piston rod leading therefrom into the other cylinder and acting as a ram therein, means providing a chamber between the cylinders, there being a passageway from the second cylinder about the piston rod to said chamber, there being an annular space about said piston rod between the wall of said chamber and the head of the first cylinder carrying said piston, means providing a passageway from said annular space to the space below said piston, a communicating passageway through said piston and a pair of check valves controlling said passageways.

8. A shock absorbing device for use between two relatively movable parts comprising two telescopically movable members one of which is attached to one of said parts and the other of which is attached to the other of said parts, each member having a cylinder, a ram operating in one of the cylinders, means providing an annular chamber around the ram and intermediate of the two cylinders constantly communicating with the ram cylinder to receive fluid forced out of such cylinder by the ram, the cylinder of the other member being spaced from said chamber, a piston in the last-mentioned cylinder connected to said ram, there being a passageway for fluid under pressure from the space between said chamber and piston whereby air may be forced into the last-mentioned cylinder by the collapsing of the shock absorber.

9. A shock absorbing device for use between two relatively movable parts, comprising two telescopically movable members, each mounted on one of the relatively movable parts, said members having axially aligned cylinders therein, each closed at its distant end, one of the cylinders being inwardly spaced from the wall of the member carrying it, leaving an annular space between them into which the other member may project, a floating member having one end thereof constituting a piston operable in one of said cylinders and having the other end thereof constituting a ram operable in the other of said cylinders, and means associated with each cylinder for permitting a restricted flow of fluid therefrom consequent upon the movement of the piston or ram in the respective cylinders.

10. In a shock absorber, the combination of two telescopically mounted cylindrical members, one of the members having a cylinder, a piston within it, a ram connected to said piston, a cylinder in the other member in which cylinder the ram operates, said members having successive portions of different diameters, the inner telescoping member having a comparatively small portion adapted to move into a comparatively large portion of the outer member, and wherein an annular space is provided between said members, and means for supplying air from the outside to such annular space.

11. In a shock absorber, the combination of two telescopically mounted cylindrical members, each of the members having a cylinder, a ram leading from one cylinder to the other and operating in each of them, said members having successive portions of different diameters, the smaller portion of the inner member being adapted to move into the larger portion of the outer member, and wherein an annular space is provided between said members, a closed air cell having a passageway therefrom to said annular space, whereby entrapped air may pass back and forth between the annular space and the air cell.

12. In a shock absorber, the combination of two telescopically connected tubular members, a head across the inner member, a partition carried by the inner member spaced from the head, a cylinder carried by the partition, a ram passing through the head and through the partition into the cylinder, means in the other tubular member for operating the ram, a conduit for supplying oil to the ram cylinder and to the chamber between the partition and head, and an overflow conduit for said oil leading from said chamber.

LUCIEN R. GRUSS.

REFERENCES CITED

The following references are of record in the file of this patent:

UNITED STATES PATENTS

| Number | Name | Date |
|---|---|---|
| 1,055,734 | Funk | Mar. 11, 1913 |
| 1,105,953 | Bates | Aug. 4, 1914 |
| 1,289,728 | Giles | Dec. 31, 1918 |
| 1,366,318 | Gruss | Jan. 18, 1921 |
| 1,733,467 | Ross | Oct. 29, 1929 |
| 1,599,573 | McElroy | Sept. 14, 1926 |
| 1,706,745 | Ribis | Mar. 26, 1929 |
| 1,733,467 | O'Meill | Oct. 29, 1929 |
| 1,819,414 | Gruss | Aug. 18, 1931 |
| 1,918,697 | Gruss | July 18, 1933 |
| 1,969,508 | Gruss | Aug. 7, 1934 |
| 2,313,242 | Johnson | Mar. 9, 1943 |

FOREIGN PATENTS

| Number | Country | Date |
|---|---|---|
| 852,704 | France | Nov. 9, 1939 |